Figure 1:
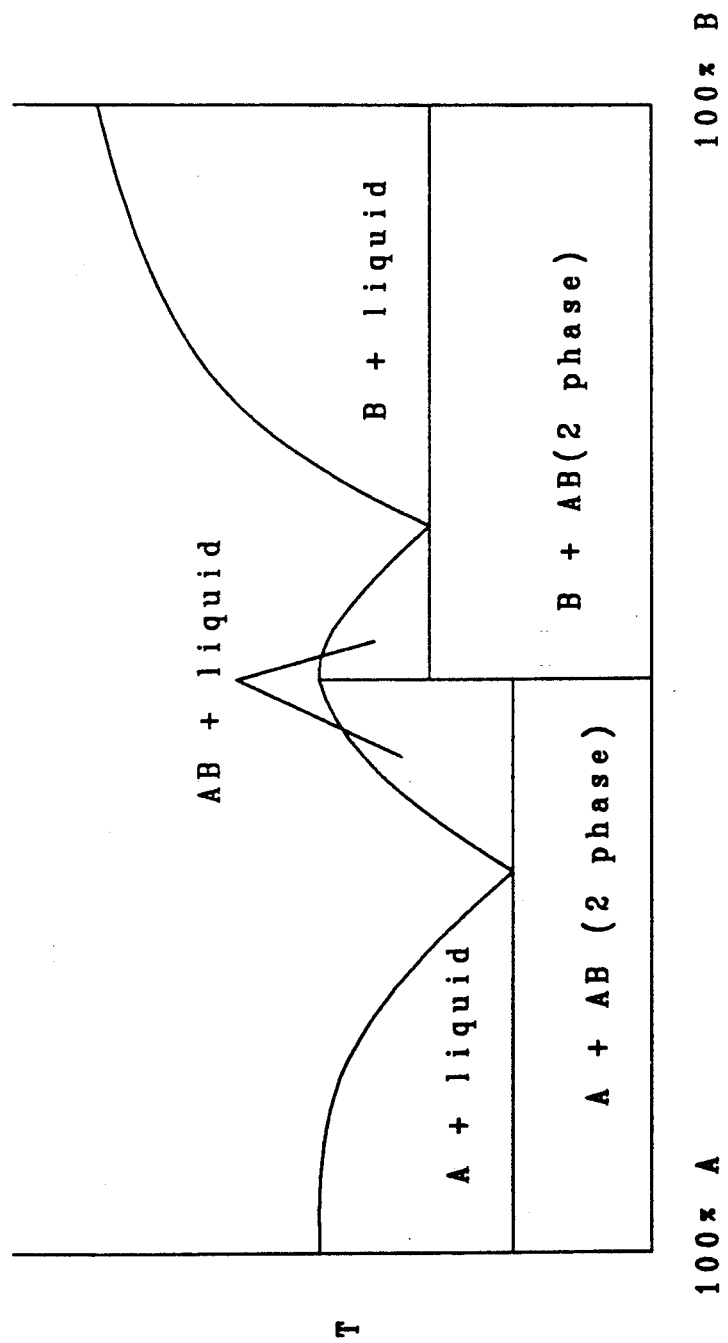

United States Patent [19]

Mather et al.

[11] Patent Number: 5,220,040

[45] Date of Patent: Jun. 15, 1993

[54] MIXED AND MIXED CRYSTAL BENZODEFURANONE DYES

[75] Inventors: Leslie A. Mather, Nr Bolton; David Brierley, Oldham; James F. Bullock, MacClesfield; Nigel Hughes, Oldham; Prakash Patel, Huddersfield, all of England

[73] Assignee: Imperial Chemical Industries PLC, London, England

[21] Appl. No.: 808,899

[22] Filed: Dec. 18, 1991

[30] Foreign Application Priority Data

Dec. 21, 1990 [GB] United Kingdom ............... 9027771
Dec. 21, 1990 [GB] United Kingdom ............... 9027915
Dec. 21, 1990 [GB] United Kingdom ............... 9027919

[51] Int. Cl.$^5$ .................. C09B 57/00; D06P 3/54; C07D 493/04

[52] U.S. Cl. ................... 549/299; 544/148; 546/197

[58] Field of Search ............ 549/299; 534/775

[56] References Cited

U.S. PATENT DOCUMENTS

| | | | |
|---|---|---|---|
| 4,115,404 | 9/1978 | Greenhalgh et al. | 549/299 |
| 4,333,877 | 6/1982 | Carey et al. | 549/299 X |
| 4,650,882 | 3/1987 | Kenyon et al. | 549/299 |
| 4,680,417 | 7/1987 | Kenyon et al. | 549/299 |
| 5,077,416 | 12/1991 | Ueda et al. | 549/299 |
| 5,084,580 | 1/1992 | Kenyon et al. | 549/299 |

FOREIGN PATENT DOCUMENTS

| | | | |
|---|---|---|---|
| 0033583 | 8/1981 | European Pat. Off. | |
| 0252406 | 1/1988 | European Pat. Off. | 549/299 |
| 0363034 | 4/1990 | European Pat. Off. | 549/299 |
| 305886 | 10/1987 | Fed. Rep. of Germany | 549/299 |
| 1-258677 | 10/1989 | Japan | 549/299 |
| 2103231 | 2/1983 | United Kingdom | 549/299 |

OTHER PUBLICATIONS

Fuerstenwerth et al, Chemical Abstracts, vol. 108, #152148r (1988).
Kenyon et al V, Chemical Abstracts, vol. 105, #192863q (1986).
Greenhalgh et al II, Chemical Abstracts, vol. 87, #186078f (1977).
Greenhalgh et al III, Chemical Abstracts, vol. 95, #221293m (1981).
Greenhalgh et al IV, Chemical Abstracts, vol. 94, #104878z (1981).
Kenyon et al VI, Chemical Abstacts, vol. 104, #70285m (1986).

Primary Examiner—Floyd D. Higel
Attorney, Agent, or Firm—Cushman, Darby & Cushman

[57] ABSTRACT

A dyestuff comprising a mixture of two or more compounds of Formula (1):

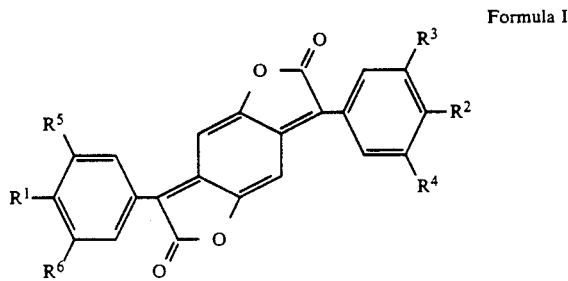

Formula I wherein:

$R^1$ & $R^2$ are each independently selected from —H, nitro, halogen, $C_{1-6}$-alkyl, $C_{1-6}$-alkoxy, phenyl, phenoxy, $C_{1-6}$-alkoxyphenyl, cyano, —COOR and —SR, hydroxy, OCO.$C_{1-6}$-alkyl, —SO$_2$OH, —SO$_2$Cl, —SO$_2$C$_{1-6}$-alkyl, —NR$_2$ and —CONR$_2$, —OC$_{1-6}$-alkyl-COOR$^7$; —OC$_{1-6}$-alkylOR$^7$, —OC$_{1-6}$-alkylOR$^7$OR$^7$, and —OC$_{1-6}$-alkylOCOR$^7$, —OC$_{2-6}$-alkenyl, —OC$_{1-6}$-alkyl-Z, —OC$_{1-6}$-alkylOC$_{1-6}$-alkyl-Z and —OC$_{1-6}$-alkylSC$_{1-6}$-alkyl-Z in which Z is a 5-, 6- or 7-membered saturated or unsaturated heterocyclic residue; and $R^3$, $R^4$, $R^5$ & $R^6$ are each independently selected from -H, $C_{1-6}$-alkyl, halogen and $C_{1-6}$—alkoxy, in which each R independently is —H, $C_{1-6}$-alkyl or phenyl and in which each $R^7$ independently is —H, $C_{1-6}$-alkyl, —$C_{1-6}$-alkyl-$C_{1-6}$—alkoxy or phenyl except where the mixture contains one compound of Formula (1) in which $R^2$ is —OC$_2$H$_5$ and $R^1$, $R^3$, $R^4$, $R^5$ and $R^6$ are all —H, one compound of Formula (1) in which $R^2$ is n-propoxy and $R^1$, $R^3$, $R^4$, $R^5$ and $R^6$ are all —H and 4-[1-cyanomethyl-4,5-dicyano imidaz-2-ylazo] N-ethyl-N(ethoxycarbonylpropyl)aminobenzene.

6 Claims, 2 Drawing Sheets

MIXED AND MIXED CRYSTAL BENZODEFURANONE DYES

This invention relates to mixtures and mixed crystals of two or more benzodifuranone (BDF) dyes which show improved package dyeing performance.

Benzodifuranone dyes are known for coloration of polyester fibres and produce bright shades with excellent wash and heat fastness properties.

According to the present invention there is provided a dyestuff comprising a mixture of two or more compounds of Formula (1):

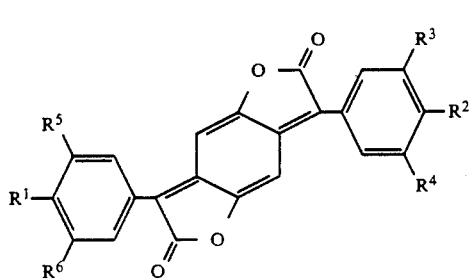

Formula I wherein:

$R^1$ & $R^2$ are each independently selected from —H, nitro, halogen, $C_{1-6}$-alkyl, $C_{1-6}$—alkoxy, phenyl. phenoxy, $C_{1-6}$—alkoxyphenyl, cyano, —COOR and —SR, hydroxy, OCO.$C_{1-6}$-alkyl, —$SO_2H$, —$SO_2Cl$, —$SO_2C_{1-6}$-alkyl, —$NR_2$ and —$CONR_2$, —$OC_{1-6}$-alkyl—$COOR^7$, —$OC_{1-6}$-alkyl$OR^7$, —$OC_{1-6}$-alkyl$OR$ $OR$, and —$OC_{1-6}$-alkyl$OCOR^7$, —$OC_{2-6}$-alkenyl, —$OC_{1-6}$-alkyl-Z, —$OC_{1-6}$-alkyl$OC_{1-6}$-alkyl-Z and —$OC_{1-6}$-alkyl$SC_{1-6}$-alkyl-Z in which Z is a 5-, 6- or 7- membered saturated or unsaturated heterocyclic residue; and $R^3, R^4, R^5$ & $R^6$ are each independently selected from —H, $C_{1-6}$-alkyl, halogen and $C_{1-6}$—alkoxy, in which each R independently is —H, $C_{1-6}$-alkyl or phenyl and in which each $R^7$ independently is —H, $C_{1-6}$-alkyl, —$C_{1-6}$-alkyl-$C_{1-6}$—alkoxy or phenyl except where the mixture contains one compound of Formula (1) in which $R^2$ is —$OC_2H_5$ and $R^1$, $R^3$, $R^4$, $R^5$ and $R^6$ are all —H, one compound of Formula (1) in which $R^2$ is n-propoxy and $R^1$, $R^3$,$R^4$, $R^5$ and $R^6$ are all —H and 4-[1-cyanomethyl-4,5-dicyano imidaz-2-ylazo]N-ethyl-N-(ethoxycarbonylpropyl)aminobenzene.

Dyestuff mixtures comprising two or more compounds of Formula (1) preferably do not include mixtures of two compounds of Formula (1) in which $R^2$ is $C_{1-4}$—alkoxy with 4-[1-cyanomethyl-4,5-dicyano imidaz-2-ylazo] N-ethyl-N-(ethoxycarbonylpropyl)aminobenzene. Where compounds other than those of Formula (1) are present in dyestuff mixtures it is preferred that these compounds are present in amounts up to 10% by weight.

Figure 2:
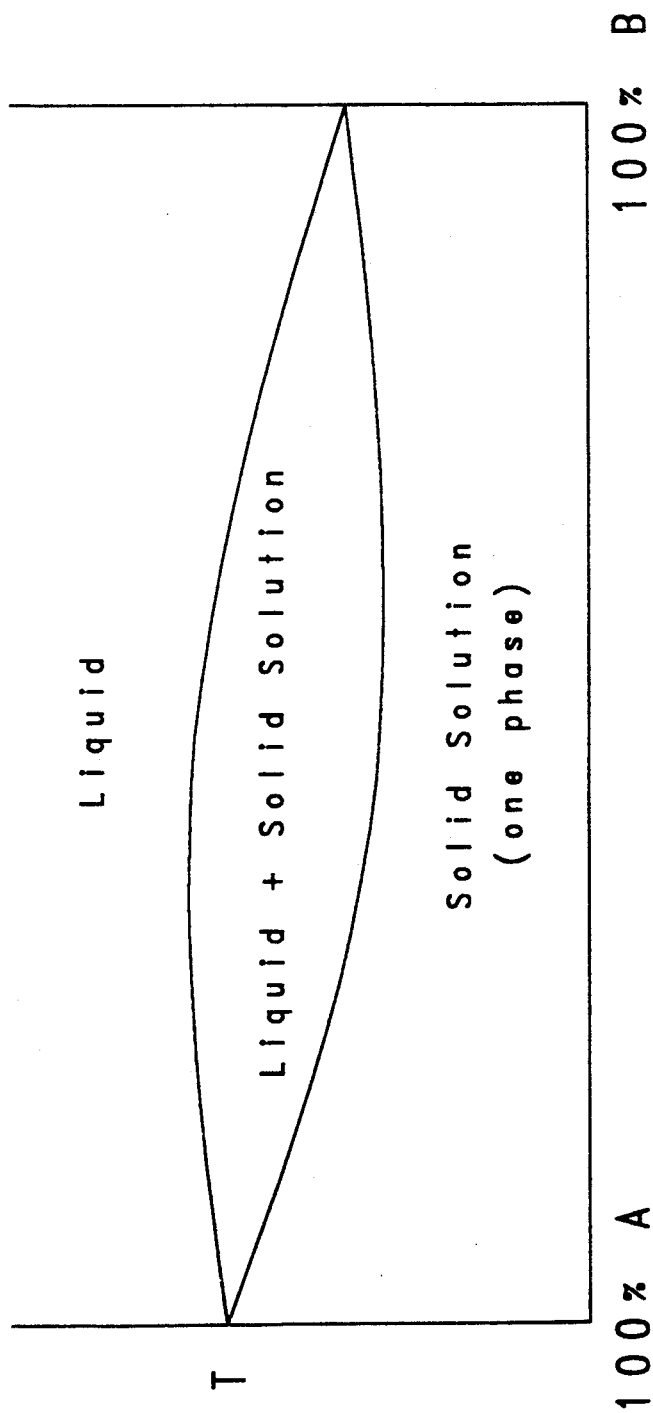

The mixtures comprising two or more compounds of Formula (1) may be physical mixtures or mixed crystals. Physical mixtures are those comprising two or more compounds of Formula (1) where the compounds are mixed before or during formulation as dyestuffs or mixed in a dyebath before or during dyeing of fabric. The term mixed crystals is used to describe a crystal of two or more compounds which crystallise together in the same system and is used to cover both stoichimetric compounds and solid solutions. Stoichimetric compounds may be composed of two components in a stoichiometric ratio and behave as if they are separate compounds. Thus a phase diagram as shown in FIG. 1 may be obtained for a stoichiometric compound. The compound AB can have a different crystal structure, as determined by its X-ray diffraction pattern, from either A or B. In a solid solution molecules of B may be distributed at random in the crystal structure of A and may replace molecules of A giving a disordered system. This replacement can occur over a range of compositions. If as shown in FIG. 2 this occurs over the composition range 100% A to 100% B there is complete miscibility.

Mixtures comprising two or more compounds of Formula (1) when used to dye fabric such as polyester generally show an improvement over individual dyes. For example dyestuff mixtures of the present invention generally give more even dye uptake on polyester yarn than the individual compounds in package dyeing, where dispersion of the dyestuff mixtures are circulated through packages of yarn, wound on spindle supports, first in one direction and then in the other. In continuous dyeing applications, where rapid and even build up on fabric is required, the present dyestuff mixtures generally perform better than the individual compounds. In batchwise dyeing the present dye mixtures generally give a better yield of colour or better depth of shade than the individual compounds. Furthermore mixed crystal dyes mill more readily, reducing to a given particle size more quickly than the individual compounds.

A preferred sub-group of dyestuffs of the present invention comprises physical mixtures of two or more compounds of Formula (1) wherein:

$R^1$ is —H, —OH, —OCO.$C_{1-6}$-alkyl, or $C_{1-6}$—alkoxy;
$R^2$ is —H or $C_{1-6}$—alkoxy; and
$R^3$, $R^4$, $R^5$ & $R^6$ are all —H; provided that both $R^1$ and $R^2$ are not —H, except where the mixture contains one compound of Formula (1) in which $R^2$ is —$OC_2H_5$ and $R^1$, $R^3$, $R^4$, $R^5$ and $R^6$ are all —H, one compound of Formula (1) in which $R^2$ is n-propoxy and $R^1$, $R^3$ $R^4$, $R^5$ and $R^6$ are all —H and 4-{1-cyanomethyl-4,5-dicyanoimidaz-2-ylazo}N-ethyl-N-(ethoxycarbonylpropyl)aminobenzene.

It is especially preferred that $R^1$ and $R^2$ are each independently —H or $C_{1-4}$—alkoxy provided that both $R^1$ and $R^2$ are not —H.

Preferred physical mixtures comprise from 1% to 55% of one compound of Formula (1) and from 99% to 45% of a different compound of Formula (1).

It is preferred that physical mixtures are self-shade mixtures. By the term self-shade it is meant that the compounds in the mixture each have similar wavelength maxima ($\lambda_{max}$) values. These $\lambda_{max}$ values are all preferably within 5 nm of each other and more preferably within 2nm of each other.

Especially preferred physical mixtures are those where: (a) in one of the compounds of Formula (I)

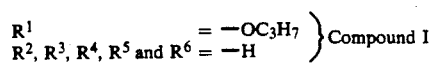

and in the other compound of Formula (I)

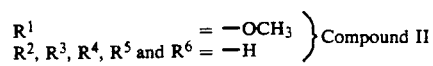

it is preferred that the mixtures comprise from 95% to 50% of Compound I and from 5% to 50% of Compound II, more preferably from 80% to 50% of Compound I and from 20% to 50% of Compound II and especially preferably from 60% to 50% of Compound I and from 40% to 50% of Compound II.

(b) one of the compounds of Formula (I) is Compound I and in the other compound of Formula (I)

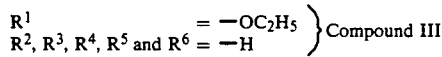Compound III it is preferred that the mixtures comprise from 95% to 50% of Compound I and from 5% to 50% of Compound III, more preferably from 80% to 50% of Compound I and from 20% to 50% of Compound III and especially preferably from 60% to 50% of Compound I and from 40% to 50% of Compound III.

(c) one of the compounds of Formula (I) is Compound I and in the other compound of Formula (I)

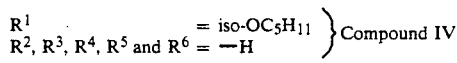Compound IV it is preferred that the mixtures comprise from 95% to 50% of Compound I and from 5% to 50% of Compound IV, more preferably from 80% to 50% of Compound I and from 20% to 50% of Compound IV and especially preferably from 60% to 50% of Compound I and from 40% to 50% of Compound IV.

(d) in one of the compounds of Formula (I)

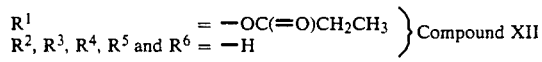Compound XII and in the other compound of Formula (I)

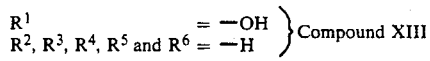Compound XIII it is preferred that the mixtures comprise from 80% to 99.5% of Compound XII and from 20% to 0.5% of Compound XIII, more preferably from 90% to 99% of Compound XII and from 10% to 1% of Compound XIII and especially from 92% to 96% of Compound XII and from 8% to 4% of Compound XIII.

(e) one of the compounds of Formula (I) is Compound XIII and in the other compound of Formula (I)

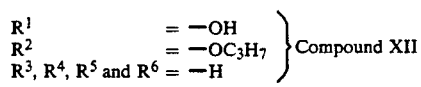Compound XII it is preferred that the mixtures comprise from 99% to 45% of Compound XIII and from 1% to 55% of Compound XII, more preferably from 80% to 45% of Compound XIII and from 20% to 55% of Compound XII and especially from 60% to 45% of Compound XIII and from 40% to 55% of Compound XII.

(f) one of the compounds of Formula (I) is Compound XIII and the other compound of Formula (I) is Compound I, it is preferred that the mixtures comprise from 99% to 45% of Compound XIII and from 1% to 55% of Compound I, more preferably from 80% to 45% of Compound XIII and from 20% to 55% of Compound I and especially from 60% to 45% of Compound XIII and from 40% to 55% of Compound I.

(g) one of the compounds of Formula (I) is Compound XIII and in the other compound of Formula (I)

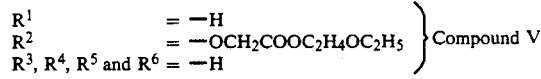Compound V it is preferred that the mixtures comprise from 99% to 45% of Compound XIII and from 1% to 55% of Compound V, more preferably from 80% to 45% of Compound XIII and from 20% to 55% of Compound V and especially from 60% to 45% of Compound XIII and from 40% to 55% of Compound V.

(h) one of the compounds of Formula (I) is Compound XIII and in the other compound of Formula (I)

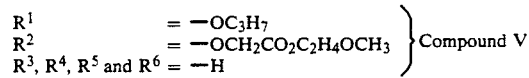Compound V it is preferred that the mixtures comprise from 99% to 45% of Compound XIII and from 1% to 55% of Compound VII, more preferably from 80% to 45% of Compound XIII and from 20% to 55% of Compound VII and especially from 60% to 45% of Compound XIII and from 40% to 55% of Compound VII.

The mixed dyes of the invention may be prepared by physically mixing appropriate portions of the individual dyes.

A further preferred sub-group of dyestuffs of the present invention comprises a mixed crystal of two or more compounds of Formula (1) wherein:
$R^1$ is selected from $-OCH_3$, $-OC_2H_5$, $-OC_3H_7$ and $-H$;
$R^2$ is selected from $-OCH_2CO_2C_2H_4OCH_3$; $-OCH_2CO_2C_2H_4C_2H_5$; $-OCH_2COOCH_3$; $OCH_2COOC_2H_5$ and $-H$;
provided that both $R^1$ and $R^2$ are not H; and
$R^3$ and $R^4$ are $-H$ or $-CH_3$.

A further preferred sub-group of dyestuffs of the present invention comprises a mixed crystal of two or more compounds of Formula (1) wherein:
$R^1$ is $-OH$ or $-OC_5H_{11}$;
$R^2$ is selected from $-OCH_2CO_2C_2H_4OCH_3$; $-OCH_2CO_2C_2H_4OC_2H_5$; $-OCH_2COOCH_3$ and $-OCH_2COOC_2H_5$; and
$R^3$ and $R^4$ are $-H$ or $-CH_3$.

Mixed crystals of the present invention may be identified by techniques such as differential thermal analysis (DTA) and differential scanning calorimietry (DSC) where the melting point/composition data obtained is used to construct a phase diagram.

Mixed crystals of the present invention may comprise two or more compounds of Formula (I) which have similar wavelength maxima ($\lambda_{max}$) or which have different $\lambda_{max}$ values.

In mixed crystals which comprise compounds of Formula (I) which have similar $\lambda_{max}$ values (self shade mixed crystals), the $\lambda_{max}$ values of each compound of Formula (I) are within 5 nm and preferably within 2 nm of each other, and the shade of such mixed crystals is substantially the same as the shade of each individual compound.

In mixed crystals which comprise compounds of Formula (I) which have different $\lambda_{max}$ values (different shade mixed crystals), the $\lambda_{max}$ values of each compound of Formula (I) are at least 5 nm apart and more preferably at least 10 nm apart, the shade of such mixed crystals may be substantially different to the shade of each individual compound.

Self shade mixed crystals preferably comprise from 0.5% to 55% of one compound of Formula (I) and from 99.5% to 45% of a different compound of Formula (1) and more preferably from 1% to 55% of one compound of Formula (I) and from 99% to 45% of a different compound of Formula (I).

Preferred self shade mixed crystals are those where:

(i) one of the compounds of Formula (I) is Compound V and in the other compound of Formula (I)

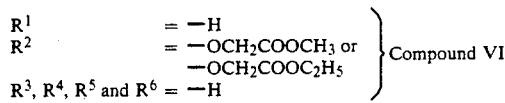

it is preferred that this mixed crystal comprises from 99.5% to 70% of Compound V and from 0.5% to 30% of Compound VI, more preferably from 99% to 80% of Compound V and from 1% to 20% of Compound VI and especially preferably from 99% to 90% of Compound V and from 1% to 10% of Compound VI.

(j) one of the compounds of Formula (I) is Compound VII and in the other compound of Formula (I)

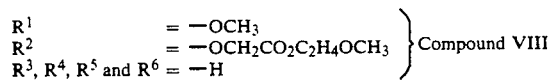

it is preferred that this mixed crystal comprises from 99% to 75% of Compound VII and from 1% to 25% of Compound VIII, more preferably from 99% to 80% of Compound VII and from 1% to 20% of Compound VIII and especially preferably from 99% to 90% of Compound VII and from 1% to 10% of Compound VIII.

(k) one of the compounds of Formula (I) is Compound VII and in the other compound of Formula (I)

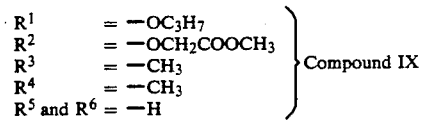

it is preferred that this mixed crystal comprises from 99% to 70% of Compound VII and from 1% to 30% of Compound IX, more preferably from 95% to 70% of Compound VII and from 5% to 30% of Compound IX and especially preferably from 90% to 75% of Compound VII and from 10% to 25% of Compound IX.

(1) one of the compounds of Formula (I) is Compound I and the other compound of Formula (I) is Compound II, it is preferred that this mixed crystal comprises from 98% to 45% of Compound I and from 2% to 45% of Compound II, more preferably from 80% to 45% of Compound I and from 20% to 55% of Compound II and especially preferably from 55% to 45% of Compound I and from 45% to 55% of Compound II.

(m) one of the compounds of Formula (I) is Compound I and the other compound of Formula (I) is Compound III, it is preferred that this mixed crystal comprises from 98% to 45% of Compound I and from 2% to 55% of Compound III, more preferably from 80% to 45% of Compound I and from 20% to 55% of Compound III and especially preferably from 55% to 45% of Compound I and from 45% to 55% of Compound III.

(n) one of the compounds of Formula (I) is Compound I and the other compound of Formula (I) is Compound IV, it is preferred that this mixed crystal comprises from 98% to 45% of Compound I and from 2% to 55% of Compound IV, more preferably from 80% to 45% of Compound I and from 20% to 55% of Compound IV and especially preferably from 55% to 45% of Compound I and from 45% to 55% of Compound IV.

Preferred different shade mixed crystals are those where:

one of the compounds of Formula (I) is Compound I and in the other compound of Formula (I)

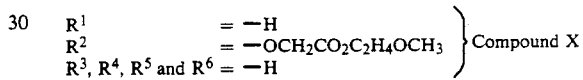

it is preferred that this mixed crystal comprises from 10% to 50% of Compound I and from 90% to 50% of Compound X, more preferably from 20% to 40% of Compound I and from 80% to 60% of Compound X and especially preferably from 25% to 35% of Compound I and from 75% to 65% of Compound X.

(o) one of the compounds of Formula (I) is Compound I and the other compound of Formula (I) is Compound V, it is preferred that this mixed crystal comprises from 10% to 50% of Compound I and from 90% to 50% of Compound V, more preferably from 20% to 40% of Compound I and from 80% to 60% of Compound V and especially preferably from 25% to 35% of Compound I and from 75% to 65% of Compound V.

(p) in one of the compounds of Formula (I) is Compound V and the other compound of Formula (I) is Compound II, it is preferred that this mixed crystal comprises from 10% to 50% of Compound V and from 90% to 50% of Compound II, more preferably from 20% to 40% of Compound V and from 80% to 60% of Compound II and especially preferably from 25% to 35% of Compound I and from 75% to 65% of Compound II.

(q) in one of the compounds of Formula (I)

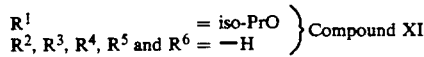

and the other compound of Formula (I) is Compound V, it is preferred that this mixed crystal comprises from 10% to 50% of Compound XI and from 90% to 50% of Compound V, more preferably from 20% to 40% of Compound XI and from 80% to 60% of Compound V and especially preferably from 25% to 35% of Compound XI and from 75% to 65% of Compound V.

(r) one of the compounds of Formula (I) is Compound V and the other compound of Formula (I) is Compound IV, it is preferred that this mixed crystal comprises from 10% to 50% of Compound IV and from 90% to 50% of Compound V, more preferably from 20% to 40% of Compound IV and from 80% to 60% of Compound V and especially preferably from 25% to 35% of Compound IV and from 75% to 65% of Compound V.

The mixed crystal dyes of the invention may be prepared by a number of methods such as:

(i) Co-crystallisation

Where at least two different dyes of Formula (I) are placed in a suitable liquid and heated up to reflux temperature of the liquid until dissolved. The resulting solution is filtered and allowed to cool to ambient temperature. The crystals formed on cooling are collected by filtration and washed with a suitable liquid. Examples of suitable liquids are organic solvents such as aromatic hydrocarbons, chlorinated hydrocarbons, aliphatic hydrocarbons, alicyclic hydrocarbons, alcohols, amides, sulphoxides, esters, ketones, ethers. Specific examples of organic solvents are toluene, ethyl cellosolve, acetone, chlorobenzene, pyridine, dimethyl formamide, dimethylsulphoxide, ethyl acetate, benzene, tetrahydrofuran, cyclohexane.

(ii) Co-synthesis (a) Where a dye carries a substituent on one or both of the phenyl rings the substituent terminating in a carboxylic acid group is esterified with a mixture of alcohols.

For example a compound of Formula (I) where $R^1=R^3=R^4=H$ and $R^2=-OCH_2COOH$ is reacted with two different alcohols such as methanol and ethoxyethanol to give two different compounds one of which has $R^2=-OCH_2COOCH_3$ (from methanol) the other has $R^2=-OCH_2COOC_2H_4OC_2H_5$ (from ethoxyethanol).

(b) Where mixed compounds of Formula (I) are prepared from mixed reactants.

For example reaction of a compound of Formula (II):

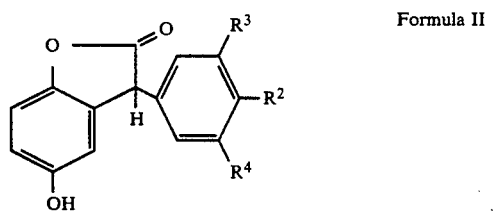

Formula II with a mixture of 4-methoxymandelic and 4-propoxymandelic acid gives a mixture of compounds of Formula (I), one in which $R^1$ is $-OCH_3$ and the other in which $R^1$ is $-OC_3H_7$.

(iii) Co-melting

Where at least two different dyes of Formula (I) are co-melted. A physical mixture of dyes is melted and mixed well before allowing to cool and crystallise.

(iv) Co-sublimation

Where at least two different dyes of Formula (I) are co-sublimed. A physical mixture of dyes is heated under vacuum. The dyes may recombine as mixed crystals.

(v) Co-milling

Where at least two different dyes of Formula (I) are co-milled.

The individual dyes of Formula (I) may be prepared by the methods detailed in European Patents 0033583 and 0146269 and in European Patent Application 0363034.

The performance of the physical mixtures was evaluated in package dyeing, where dispersions of the BDF dyes were circulated through packages of yarn first in one direction then in the other, and it was found that these mixtures comprising two or more BDF dyes have particularly good performance in package dyeing and a better performance than the individual dyes alone.

The invention is illustrated by the following examples in which all parts are by weight.

The following physical mixtures were prepared and yarn was package dyed at 140° C. with these mixtures.

| Example | Compound I (parts) | Compound II (parts) |
|---------|--------------------|--------------------|
| 1 | 9.0 | 1.0 |
| 2 | 8.0 | 2.0 |
| 3 | 5.0 | 5.0 |

The package dyeing procedure involves winding polyester fabric onto a supporting sleeve and then winding yarn on top of the polyester fabric, outer and inner in Table 1 refer to the position of the yarn on the sleeve.

The dyed yarn samples were compared with yarn samples dyed with Compound I alone and with Compound II alone. The package dyeing test is an important application test and provides a measure of how dyes will perform in a commercial dyeing system. After package dyeing a colorist assesses the performance of a dye or dye mixture by examining the rub fastness of the yarn from the outer part and from the inner part of the winding on the sleeve. Numerical values for performance of the dyes are given and these values follow a geometric progression, ie, a rub fastness of 5 is 2 times better than a rub fastness of 4 and a rub fastness of 5 is 4 times better than a rub fastness of 3. Thus the higher the numerical value the better the performance of the dye. The polyester fabric wound on the supporting sleeve is also assessed for staining by the dye or dye mixture. The performance of the dye is assessed by a colorist according to the following series where the amount of stain is increasing —Tr (trace), —L (little), —S (some), —H (heavy). The less the stain the better the performance of the dye.

The results are summarised in Table 1:

TABLE 1

| | Rub Fastness | | |
|---|---|---|---|
| | Outer | Inner | Stain |
| Example 1 | 4–5 | 3–4 | L |
| Example 2 | 4 | 4–5 | L |
| Example 3 | 5 | 4 | Tr |
| Compound I | 4 | 2 | L-S |
| Compound II | 4–5 | 4 | Tr-L |

The mixture of Example 1 comprises 90% of Compound I and 10% of Compound II and thus one would expect rub fastness and stain performance of this mixture to be close to that of Compound I alone, however the outer rub fastness of the mixture has improved over that of Compound II, the inner rub fastness value has improved from 2 to 3–4 and the staining is less. The mixture of Example 2 comprises 80% of Compound I and 20% of Compound II and the mixture has a better inner rub fastness value of 4–5 than the values of 2 and 4 obtained for the dyes alone. The mixture of Example 3 comprises 50% of each of Compound I and Compound II and this mixture has an outer rub fastness value of 5 which is better than either of the dyes alone, a better inner rub fastness value of 4 and less stain than would be expected.

The performance of the physical mixtures was also evaluated in batchwise dyeing of polyester fabric. The build-up of dye mixtures on the polyester was assessed using Compound I as control at three depths (pale, medium and heavy) at a dyebath temperature of 130° C. and at a heavy depth at a dyebath temperature of 140° C. Improved build-up of dye on the polyester fabric occurs when for the same amount of applied dye a greater proportion of the dye goes onto the fabric to give a greater depth of shade (colour yield). Thus, the higher the build-up of dye on the fabric, the less dye that is required to achieve a particular depth of shade and the more economical it is in use. The physical mixture of Example 3 showed good build up when compared with Compound I alone.

The following physical mixtures were used to dye polyester fabric at dyebath temperatures of 130° C and 140° C:

| Example | Compound | % | Compound | % |
| --- | --- | --- | --- | --- |
| 4 | I | 50 | III | 50 |
| 5 | I | 50 | IV | 50 |

Polyester fabric samples dyed with the physical mixtures of Examples 3 and 4 showed an improvement in colour yield at heavy depth when compared with polyester dyed with Compound I alone.

In addition the colour yield on polyester at 130° C. for the mixtures of Examples 3 and 4 was equivalent to the colour yield of Compound I at 140° C.. Thus the present dye mixtures allow the use of lower dyebath temperatures and because lower temperatures may be employed more energy efficient dyeing is achieved.

EXAMPLE 6

A mixture of 3-phenyl-7-[4-(2-ethoxyethoxycarbonylmethoxy) phenyl]-2,6-dioxo-2,6-dihydrobenzo[1:2-b, 4:5-b¹] difuran (3.9 parts) and 3-phenyl-7-[4-(methoxycarbonylmethoxy)phenyl]-2,6-dioxo-2,6-dihydrobenzo[1:2-b, 4:5-b¹] difuran (0.1 parts) were dissolved in toluene (350 parts) by refluxing for 15 minutes. The hot toluene solution was filtered to remove any insoluble matter and was allowed to cool. The solid which crystallised was filtered off, washed with acetone (50 parts) and then with water (50 parts) before drying at 70° C. for 16 hours to give a mixed crystal of the two dyes.

EXAMPLE 7

The procedure of Example 1 was repeated except that 3-phenyl-7-[4-(ethoxycarbonylmethoxy)phenyl]-2,6-dioxo-2,6-dihydrobenzo[1:2-b, 4:5-bl] difuran (0.4 parts) was used in place of the 0.1 parts of 3-phenyl-7-[4-(methoxycarbonylmethoxy)phenyl]-2,6-dioxo-2,6-dihydrobenzo[1:2-b, 4:5-bl] difuran and 3.6 parts instead of 3.9 parts of 3-phenyl-7-[4-(2-ethoxyethoxycarbonylmethoxy)phenyl]-2,6-dioxo-2,6-dihydrobenzo[1:2-b, 4:5-b¹] difuran were used.

General Co-crystallisation Method

A mixture of dyes of Formula (I) in total 4 parts by weight, was dissolved in refluxing toluene (400 parts). The hot toluene solution was filtered to remove any insoluble matter and was allowed to cool. The solid which crystallised was filtered off and dried to give a mixed crystal of the dyes. The following mixed crystals were prepared using this general co-crystallisation method:

| Example | Compound | % | Compound | % |
| --- | --- | --- | --- | --- |
| 8 | VII | 90 | VIII | 10 |
| 9 | VII | 80 | IX | 20 |
| 10 | V | 98 | VI | 2 |
| 11 | V | 95 | VI | 5 |
| 12 | V | 90 | VI | 10 |
| 13 | I | 50 | III | 50 |
| 14 | I | 50 | IV | 50 |
| 15 | V | 70 | I | 30 |
| 16* | X | 70 | I | 30 |
| 17 | V | 70 | II | 30 |
| 18 | V | 70 | XI | 30 |
| 19 | V | 70 | IV | 30 |

*in Example 16 a total of 7 parts of mixed dyes was dissolved in 700 parts of toluene.

The performance of these mixed crystal dyes was evaluated in package dyeing where dispersion of the dyes are circulated through packages of yarn first in one direction and then in the other and it has been found that mixed crystals of two or more dyes have particularly good performance in package dyeing and a better performance than the individual dyes alone. In addition the performance of some of these mixed crystal dyes in continuous dyeing, where a rapid build up on fabric is required, is better than with the individual dyes alone and in batchwise dyeing a better yield of colour on the fabric is obtained. An additional benefit is found during milling, the mixed crystal dyes reduce to a certain particle size more quickly than the individual dyes.

We claim:

1. A mixture of two compounds of the formula:

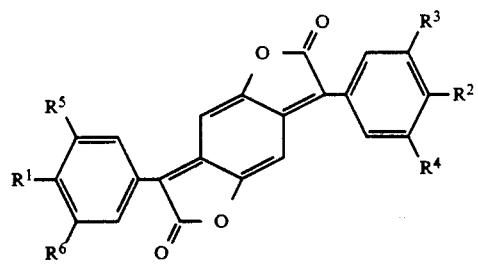

wherein:

R¹ & R² are each independently selected from —H, nitro, halogen, $C_{1-6}$-alkyl, $C_{1-6}$—alkoxy, phenyl, phenoxy, $C_{1-6}$—alkoxyphenyl, cyano, —COOR and —SR, hydroxy, $OCO.C_{1-6}$-alkyl, —SO₂OH, —SO₂Cl, —SO₂C₁₋₆-alkyl, —NR₂ and —CONR₂, —OC₁₋₆-alkyl-COOR⁷, —OC₁₋₆-alkylOR⁷, —OC₁₋₆-alkylOR OR, and —OC₁₋₆-alkylOCOR⁷, —OC₂₋₆-alkenyl, and $R^3$, $R^4$, $R^5$ & $R^6$ are each independently selected from —H, $C_{1-6}$-alkyl or phenyl and in which each $R^7$ independently is —H, $C_{1-6}$-alkyl, —$C_{1-6}$-alkyl—$C_{1-6}$-alkoxy or phenyl except where the mixture contains one compound of Formula (1) in which $R^2$ is —$OC_2H_5$ and $R^1$, $R^3$, $R^4$, $R^5$ and $R^6$ are all —H, one compound of Formula (1) in which $R^2$ is n-propoxy and $R^1$, $R^3$, $R^4$, $R^5$ and $R^6$ are all —H and 4-[1-cyanomethyl-4,5-dicyano imidaz-2-ylazo] N-ethyl-N-(ethoxycarbonylpropyl)aminobenzene.

2. A physical mixture of two compounds of the formula:

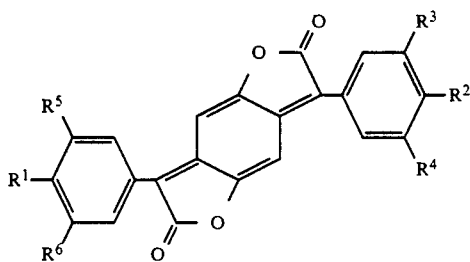

wherein:

$R^1$ is —H, —OH, —OCO.$C_{1-6}$-alkyl, or $C_{1-6}$-alkoxy;

$R^2$ is —H or $C_{1-6}$—alkoxy; and $R^3$, $R^4$, $R^5$ & $R^6$ are all —H; provided that both $R^1$ and $R^2$ are not —H, except where the mixture contains one compound of Formula (1) in which $R^2$ is —$OC_2H_5$ and $R^1$, $R^3$, $R^4$, $R^5$ and $R^6$ are all —H, one compound of Formula (1) in which $R^2$ is n-propoxy and $R^1$, $R^3$ $R^4$, $R^5$ and $R^6$ are all —H and 4-[1-cyanomethyl-45-dicyanoimidaz-2-ylazo]N-ethyl-N-(ethoxycarbonylpropyl)aminobenzene.

3. A mixed crystal of two compounds of the formula:

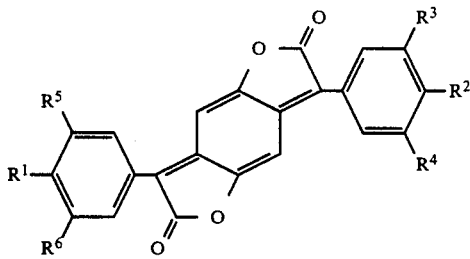

wherein:

$R^1$ is selected from —$OCH_3$, —$OC_2H_5$, —$OC_3H_7$ and —H;

$R^2$ is selected from —$OCH_2CO_2C_2H_4OCH_3$; —$OCH_2CO_2C_2H_4OC_2H_5$; —$OCH_2COOCH_3$; $OCH_2COOC_2H_5$ and —H;

provided that both $R^1$ and $R^2$ are not H; and $R^3$ and $R^4$ are —H or —$CH_3$.

4. A mixed crystal of two compounds of the formula:

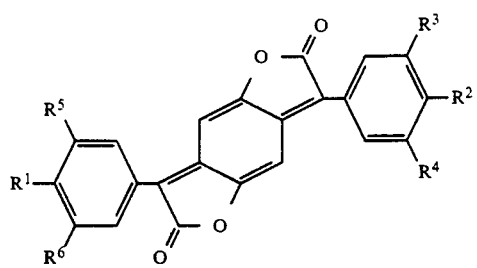

wherein:

$R^1$ is —OH or —$OC_5H_{11}$;

$R^2$ is selected from —$OCH_2CO_2C_2H_4OCH_3$; —$OCH_2CO_2C_2H_4OC_2H_5$; —$OCH_2COOCH_3$ and —$OCH_2COOC_2H_5$; and $R^3$ and $R^4$ are —H or —$CH_3$.

5. A self-shade physical mixture of two compounds of the formula:

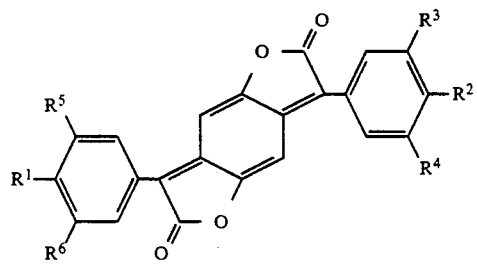

wherein: $R^2$ & $R^2$ are each independently selected from —H, nitro, halogen, $C_{1-6}$-alkyl, $C_{1-6}$-alkoxy, phenyl, phenoxy, $C_{1-6}$-alkoxyphenyl, cyano, —COOR and —SR, hydroxy, OCO.$C_{1-6}$-alkyl, —$SO_2OH$, —$SO_2Cl$, —$SO_2C_{1-6}$-alkyl, —$NR_2$ and —$CONR_2$, —$OC_{1-6}$-alkyl-$COOR^7$, —$OC_{1-6}$-alkyl$OR$, —$OC_{1-6}$-alkyl$OR^7OR^7$, and —$OC_{1-6}$-alkyl$OCOR^7$, —$OC_{2-6}$-alkenyl; and $R^3$, $R^4$, $R^5$ & $R^6$ are each independently selected from —H, $C_{1-6}$-alkyl, halogen and $C_{1-6}$—alkoxy, in which each R independently is —H, $C_{1-6}$-alkyl or phenyl and in which each $R^7$ independently is —H, $C_{1-6}$-alkyl, —$C_{1-6}$-alkyl—$C_{1-6}$-alkoxy or phenyl except where the mixture contains one compound of Formula (1) in which $R^2$ is n-propoxy and $R^1$, $R^3$, $R^4$, $R^5$ and $R^6$ are all —H, one compound of Formula (1) in which $R^2$ is n-propoxy and $R^1$, $R^3$, $R^4$, $R^5$ and $R^6$ are all —H and 4-[1-cyanomethyl-4,5-dicyano imidaz-2-ylazo] N-ethyl-N-(ethoxycarbonylpropyl)aminobenzene.

6. A mixed crystal of two compounds of the formula:

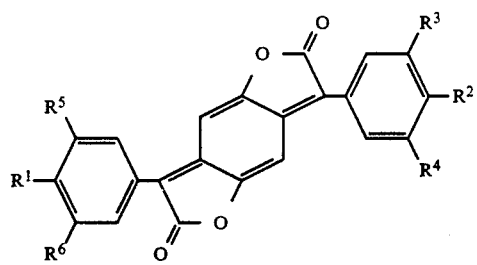

wherein: $R^1$ & $R^2$ are each independently selected from —H, nitro, halogen, $C_{1-6}$-alkyl, $C_{1-6}$—alkoxy, phenyl, phenoxy, $C_{1-6}$—alkoxyphenyl, cyano, —COOR and —SR, hydroxy, OCO.$C_{1-6}$-alkyl, —$SO_2OH$, —$SO_2Cl$, —$SO_2C_{1-6}$-alkyl, —$NR_2$ and —$CONR_2$, —$OC_{1-6}$-alkyl-$COOR^7$, —$OC_{1-6}$-alkyl$OR^7$, —$OC_{1-6}$-alkyl$OR^7OR^7$, and —$OC_{1-6}$-alkyl$OCOR^7$, —$OC_{2-6}$-alkenyl; and $R^3$, $R^4$, $R^5$ & $R^6$ are each independently selected from —H, $C_{1-6}$-alkyl, halogen and $C_{1-6}$—alkoxy, in which each R independently is —H, $C_{1-6}$-alkyl or phenyl and in which each $R^7$ independently is —H, $C_{1-6}$-alkyl, —$C_{1-6}$-alkyl—$C_{1-6}$-alkoxy or phenyl except where the mixture contains one compound of Formula (1) in which $R^2$ is n-propoxy and $R^1$, $R^3$, $R^4$, $R^5$ and $R^6$ are all —H, one compound of Formula (1) in which $R^2$ is n-propoxy and $R^1$, $R^3$, $R^4$, $R^5$ and $R^6$ are all —H and 4-[1-cyanomethyl-4,5-dicyano imidaz-2-ylazo] N-ethyl-N-(ethoxycarbonylpropyl)aminobenzene.

* * * * *